US010278035B2

(12) United States Patent
Chien

(10) Patent No.: US 10,278,035 B2
(45) Date of Patent: *Apr. 30, 2019

(54) DEVICE PAIRING FOR TEXTUAL COMMUNICATIONS

(71) Applicant: AT&T Mobility II LLC, Atlanta, GA (US)

(72) Inventor: Ginger Chien, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,035

(22) Filed: Mar. 5, 2018

(65) Prior Publication Data

US 2018/0199168 A1    Jul. 12, 2018

Related U.S. Application Data

(63) Continuation of application No. 14/982,819, filed on Dec. 29, 2015, now Pat. No. 9,913,111.

(51) Int. Cl.
*H04W 4/12* (2009.01)
*H04W 4/16* (2009.01)
*H04W 4/80* (2018.01)
*H04W 76/10* (2018.01)
*H04W 76/23* (2018.01)

(52) U.S. Cl.
CPC .............. *H04W 4/12* (2013.01); *H04W 4/16* (2013.01); *H04W 4/80* (2018.02); *H04W 76/10* (2018.02); *H04W 76/23* (2018.02)

(58) Field of Classification Search
CPC ..... H04L 63/061; H04L 63/062; H04B 1/082; H04B 1/3822; H04B 7/24; G08G 1/0962; G08G 1/205; G08G 1/142; H04W 4/008; H04W 4/14; H04W 12/04; H04W 76/02; H04W 76/023; H04W 28/18; H04W 48/04; H04M 1/72552; H04M 2203/651
See application file for complete search history.

(56) References Cited

U.S. PATENT DOCUMENTS

| 8,428,645 B2 | 4/2013 | Rao |
| 8,705,722 B2 | 4/2014 | Boni et al. |
| 8,787,949 B2 | 7/2014 | Sumcad et al. |

(Continued)

FOREIGN PATENT DOCUMENTS

| KR | 20140124407 | 10/2014 |
| WO | WO 2014/095069 | 6/2014 |
| WO | WO 2015/094220 | 6/2015 |

*Primary Examiner* — Nizar N Sivji

(57) ABSTRACT

Devices, methods, and computer-readable media are disclosed for processing a communication. For example, a method may include a processor of a first mobile device receiving a communication for the first mobile device from a third-party device, the communication including a textual content, modifying the communication based upon a pairing profile associated with a second mobile device to create a modified communication, and forwarding the modified communication to the second mobile device via a wireless connection in accordance with the pairing profile. The method may further include the processor receiving a content responding to the communication from the second mobile device and transmitting a response message including the content to the third-party device.

20 Claims, 4 Drawing Sheets

(56) References Cited

U.S. PATENT DOCUMENTS

| | | |
|---|---|---|
| 9,191,988 B2 | 11/2015 | Newham |
| 2002/0142803 A1* | 10/2002 | Yamamoto .......... H04M 1/6091 |
| | | 455/557 |
| 2004/0185915 A1 | 9/2004 | Ihara et al. |
| 2007/0135087 A1* | 6/2007 | Villevieille ......... H04M 1/6091 |
| | | 455/403 |
| 2007/0300063 A1 | 12/2007 | Adams et al. |
| 2010/0278345 A1 | 11/2010 | Alsina et al. |
| 2011/0053506 A1 | 3/2011 | Lemke et al. |
| 2011/0105097 A1 | 5/2011 | Tadayon et al. |
| 2012/0071096 A1 | 3/2012 | Matsushita et al. |
| 2012/0171963 A1* | 7/2012 | Tsfaty .................. H04B 11/00 |
| | | 455/41.3 |
| 2012/0172012 A1 | 7/2012 | Sumcad et al. |
| 2012/0176232 A1 | 7/2012 | Bantz et al. |
| 2013/0332850 A1 | 12/2013 | Bovet et al. |
| 2014/0073300 A1 | 3/2014 | Leeder et al. |
| 2014/0094124 A1 | 4/2014 | Dave et al. |
| 2014/0309862 A1 | 10/2014 | Ricci |
| 2014/0349619 A1 | 11/2014 | Basir et al. |
| 2014/0378063 A1 | 12/2014 | Nathwani et al. |
| 2015/0004946 A1 | 1/2015 | Schmidt |
| 2015/0120416 A1 | 4/2015 | Davis |
| 2015/0147973 A1 | 5/2015 | Williams et al. |
| 2015/0245186 A1 | 8/2015 | Park et al. |
| 2015/0327034 A1 | 11/2015 | Abramson et al. |
| 2015/0358471 A1* | 12/2015 | Roth ..................... B60K 37/00 |
| | | 455/417 |
| 2016/0073240 A1 | 3/2016 | Helm |
| 2016/0112471 A1 | 4/2016 | Ezell et al. |
| 2016/0165031 A1 | 6/2016 | Gopinath |
| 2016/0183069 A1 | 6/2016 | Wilson et al. |

* cited by examiner

DEVICE PAIRING FOR TEXTUAL COMMUNICATIONS

This application is a continuation of U.S. patent application Ser. No. 14/982,819, filed Dec. 29, 2015, now U.S. Pat. No. 9,913,111, which is herein incorporated by reference in its entirety.

The present disclosure relates generally to mobile devices, and more particularly, to devices, methods, and computer-readable media for pairing mobile devices for communications from third-party devices that include textual content.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
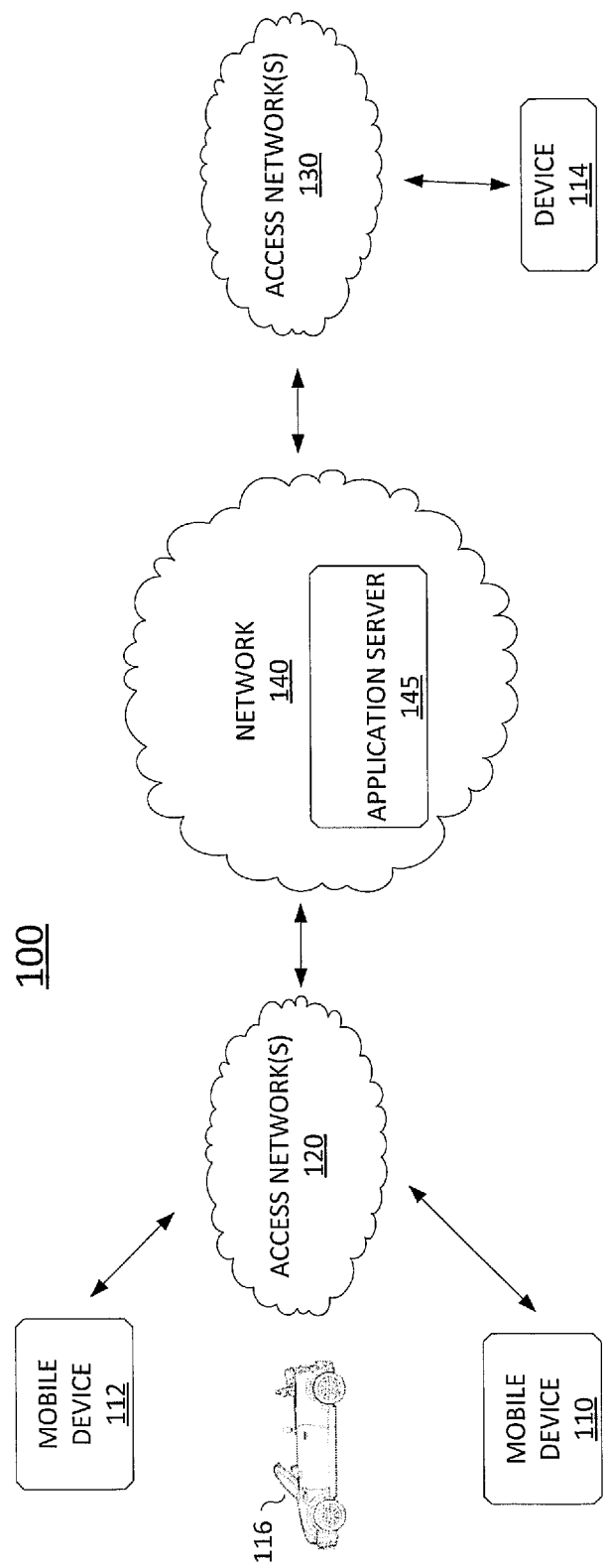
FIG. 1 illustrates an example system related to the present disclosure.

The present disclosure relates to mobile device pairings where a primary mobile device associated with a first user may be paired with a secondary mobile device that is associated with a second user. When paired, a communication from a third-party device to the primary device may be forwarded by the primary device to the secondary device. In addition, the secondary device may receive the communication that is forwarded by the primary device, obtain content for a response message, and send the content back to the primary device to send in the response message to the third-party device. For example, a driver operating a vehicle may receive an urgent message that he or she would like to review and/or respond to immediately but cannot do so given that the driver is operating the vehicle. However, another person may be a passenger in the vehicle and may be available to review and respond to the message on behalf of the driver. Nevertheless, the driver may prefer to not give full access to his or her mobile device to the passenger.

To illustrate, in one example a communication from a third-party device to the primary mobile device that includes a textual content may be forwarded to the secondary mobile device that is paired with the primary mobile device. In accordance with the present disclosure, a communication (e.g., a message) that includes a textual content may comprise a text-based message, such as a text message or Short Message Service (SMS) message, an email, an instant message via a chat application or via a social network application, and the like. The secondary mobile device may then be permitted to interact with and/or respond to the message according to a pairing profile established for the secondary mobile device by the primary mobile device, or by the user of the primary mobile device. In one example, the pairing profile may establish a device mirroring, or a partial device mirroring of the primary mobile device at the secondary mobile device. For example, a modified user interface, e.g., a reduced user interface, may be provided by the primary mobile device to the secondary mobile device. In another example, the secondary mobile device may create a reduced user interface in accordance with the pairing profile for the secondary mobile device.

In one example, the reduced user interface may exclude at least one user interface feature that is available in a user interface of the primary mobile device for interacting with the communication. In one example, the pairing profile may alternatively or additionally specify that the communication should be modified for presentation via the secondary mobile device. The pairing profile may further specify how the communication is to be modified for forwarding to the secondary mobile device and/or for presentation on the secondary mobile device. Thus, for example, the primary mobile device may retain a copy of the pairing profile or may store aspects of the pairing profile that relate to operations to be performed by the primary mobile device in connection with the device pairing.

To illustrate, incoming short message service (SMS) messages may be received at the primary mobile device. The primary mobile device may generally present the SMS messages and a user interface for handling the SMS messages in a particular way. For example, a field for typing a response to an SMS message may typically be presented. In addition, a picture of the sender, a name of the sender, and/or a phone number of the sender may be displayed along with the text of the message. In one example, a history of SMS messages between the primary mobile device and the device of the sender may also be displayed. A number of options may also be displayed, such as adding the sender to a contact list, forwarding the message to other recipients, taking a screenshot of the message, and so forth. Thus, the primary mobile device may generally display a textual portion of the communication on a screen.

In one example, the pairing profile for the secondary mobile device may specify that the communication from a third-party device should be forwarded from the primary mobile device to the secondary mobile device, but the user interface for the secondary mobile device should be modified or comprise a reduced feature set as compared to how the communication may be presented on the primary mobile device. For example, a communication history between the primary mobile device and the third-party device, i.e., the device of the sender, may not be displayed along with a content of the communication. In another example, a picture, a telephone number, a name and/or another identifier of the sender may be omitted from the display. In addition, the response options for the user of the secondary mobile device to craft content for a response message may be limited. For instance, the pairing profile may include a restriction such that a text-only content for the response is permitted. Similarly, the pairing profile may prevent a forwarding of the communication to additional recipients from the secondary mobile device.

Alternatively or in addition, the pairing profile for the secondary mobile device may specify that the communication from a third-party device should be forwarded to the secondary mobile device, but the communication should be modified as compared to how the communication may be presented on the primary mobile device. For example, for an MMS message, only the text of the message may be presented. In other words, any multimedia attachment may be removed before forwarding the modified message to the secondary mobile device, or excluded from presentation by the secondary mobile device. Similar modified communications may be generated for other types of communications. For instance, email attachments may be removed from an email communication before forwarding the email from the primary mobile device to the secondary mobile device, email chains may be removed such that only the content of the current email message is available, and so forth.

In another example, a contact list on the primary mobile device may store modified identities or anonymous identifiers of various contacts that may be substituted for use on the secondary mobile device. For instance, a user of the primary mobile device may designate his or her brother only as "family member 3" such that an incoming message from the brother will only appear as a message from "family member 3" when presented on the secondary mobile device. In one example, header information of a communication may be removed before forwarding to the secondary mobile device. For instance, an email header may include a routing path for the email to reach an email server from the device of the sender. Similar header information may be included in SMS and MMS messages, and other communications that include textual content. In one example, the primary mobile device may remove the header information, substitute alternative header information, obscure the header information via encryption, and so forth. For example, the user of the primary mobile device may prefer that details of an email service are not made available to the secondary mobile device.

In one example, the primary mobile device may receive an authorization to release an extended version of the communication and may transmit the extended version of the communication to the secondary mobile device. For example, an extended version of the communication may comprise the full communication, or additional content of the communication as compared to the modified communication. In another example, the primary mobile device may receive an authorization to extend the reduced user interface to either a full user interface (or substantially full user interface, subject to the capabilities of the first mobile device and second mobile device, respectively) or an extended user interface that includes at least one additional feature as compared to the reduced user interface. For example, the extended user interface may include a module for playing a multimedia portion of a communication, a display area for displaying at least one identifier of a third-party sending the communication, or a user input module for saving the message, forwarding the message, or printing the message.

In one example, the display area may be for displaying a true identifier of the third-party, e.g., including a telephone number, a real name, an email address, an account handle, a photograph or picture, a chat history, etc., whereas the reduced user interface that is initially extended to the second mobile device in accordance with the pairing profile may include an anonymous identifier of the third-party. In another example, the extended user interface may permit forwarding or saving of the communication, playing of an audio recording, video, or image portion of the communication, and so forth.

To illustrate, a user of the secondary mobile device may converse with the user of the primary mobile device and convey basic information with respect to the communication. If the user of the primary mobile device is comfortable with releasing more details of the communication or the full communication and/or the full or an extended user interface to the secondary mobile device based upon the basic information, the user of the primary mobile device may submit a command to the primary mobile device indicating a permission to release more of the communication or the full communication, or to extend the user interface of the secondary mobile device to include additional features for the user of the second mobile device to interact with and respond to the communication.

In one example, an incoming communication from a third-party device is received at the primary mobile device via a cellular network connection and forwarded to the secondary device wirelessly via a non-cellular network connection, e.g., via Institute of Electrical and Electronics Engineers (IEEE) 802.11, Bluetooth, Bluetooth Low Energy (BLE), and so forth. However, in other examples, the communication may be received by the primary mobile device via a non-cellular wireless connection or via a wired connection. Similarly, the forwarding from the primary mobile device to the secondary mobile device may occur via the same cellular network connection, or via different cellular network connections, via a wired connection, and so forth.

The pairing of the primary mobile device and the secondary mobile device may occur under a number of conditions. For instance, a pairing profile may be created for the secondary mobile device by the user of the primary mobile device in advance. The pairing profile may include a set of permissions as well as identification information for the secondary mobile device to detect when it should be paired with the primary mobile device. For example, a device identity of the primary mobile device may be provided for the secondary mobile device to listen for in the wireless environment. Thus, when the primary mobile device and the secondary mobile device are in proximity to one another, the devices may be configured to listen for and to detect the presence of the other device.

In one example, at least one additional parameter may be verified before pairing the mobile devices in accordance with the pairing profile. For instance, upon the primary and secondary mobile devices detecting each other's presence, a confirmation dialog may be provided to one or both of the devices to confirm that the devices should be paired according to the pairing profile. Thus, two colleagues may be in the office where pairing is not desired. Accordingly, one or both of the colleagues may decline the pairing when prompted via a confirmation dialog on one or both of the respective mobile devices. However, if the two colleagues enter a vehicle for a business trip, the desire for pairing may be confirmed.

Examples of additional criteria that may be verified before pairing may also include the detection of both mobile devices moving at a particular speed or a detection by both mobile devices of a vehicle. For example, a connection to an in-vehicle navigation system via Bluetooth or the like may be used as an additional criteria. In one example, one or both of the primary mobile device and the secondary mobile device may be prompted to confirm that pairing should occur when the mobile devices are proximate to each other and when at least one parameter is detected.

Thus, examples of the present disclosure may find particular application where, for example, an executive is travelling with an assistant or one or more other colleagues and would like to have communications with textual content responded to, without granting full access to the executive's personal mobile device. The user of the secondary mobile device may then craft content for a response to the communication under the direction of the user of the primary mobile device. The content for the response may be forwarded from the secondary mobile device back to the primary mobile device. The primary mobile device may then package the response for transmission back to the third-party device that sent the initial communication. These and other aspects of the present disclosure are described in greater detail below in connection with the discussion of FIGS. 1-4.

FIG. 1 is a block diagram depicting one example of a network or communications system 100 related to examples of the present disclosure. The overall communications system 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), a multi-protocol label switching (MPLS network), a frame relay network, an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As illustrated in FIG. 1, system 100 may include a network 140. In one example, the network 140 may be operated by a telecommunications service provider. In one embodiment, the network 140, broadly a "communications network," may be in communication with one or more access networks 120 and 130. The access networks 120 and 130 may include a wireless access network (e.g., an IEEE 802.11/Wi-Fi network and the like), a cellular access network, a PSTN access network, a cable access network, a digital subscriber line (DSL) network, a metropolitan area network (MAN), other types of wired access networks, an Internet service provider (ISP) network, and the like. In one embodiment, the access networks 120 and 130 may all be different types of access networks, may all be the same type of access network, or some access networks may be the same type of access network and other may be different types of access networks. The network 140 and the access networks 120 and 130 may be operated by different service providers, the same service provider or a combination thereof. Alternatively, or in addition, access networks 120 and 130 may represent corporate, governmental or educational institution LANs, a home/residential LAN, and the like. The network 140 and the access networks 120 and 130 may be interconnected via one or more intermediary networks (not shown) which may utilize various different protocols and technologies for transporting communications in the form of data packets, datagrams, protocol data units (PDUs), and the like, such as one or more IP/MPLS networks, on or more frame relay networks, one or more ATM networks, and so forth.

In one example, mobile devices 110 and 112 may each comprise one of: a mobile phone, a smart phone, an email device, a computer tablet, a messaging device, a Personal Digital Assistant (PDA), a wireless fidelity (Wi-Fi) device, a tablet, or the like, or a wearable computing device, such as a head-mounted smart camera, a smart watch, and so forth. In one example, mobile devices 110 and 112 may include components which support peer-to-peer and/or short range wireless communications. Thus, each of mobile devices 110 and 112 may include one or more radio frequency (RF) transceivers, e.g., for cellular communications and/or for non-cellular wireless communications, such as for Wi-Fi, Wi-Fi Direct, Bluetooth, and/or BLE communications, and so forth. In addition, mobile devices 110 and 112 may be equipped with display screens, speakers or headsets, and the like for displaying and/or presenting communications and for receiving inputs for interacting with such communications. In one example, mobile devices 110 and 112 may each comprise a computing system, such as computing system 400 depicted in FIG. 4, and may be configured to provide one or more functions for processing a communication that includes a textual content, as described in connection with the example method 200 of FIG. 2 or method 300 of FIG. 3, and/or as described elsewhere herein. In one example, device 114 may comprise a mobile device of a same or a similar nature to mobile devices 110 and 112. In another example, device 114 may comprise a desktop computer, a laptop computer, a tablet computer, a smart television, a server, a cluster of such devices, and the like.

In the example of FIG. 1, network 140 and access networks 120 and 130 provide pathways for communications between mobile devices 110 and 112, and device 114. In one example, mobile device 110 may comprise a primary mobile device and mobile device 112 may comprise a secondary mobile device according to a pairing profile of the present disclosure. In addition, device 114 may comprise a third-party device for sending communications to the primary mobile device, e.g., mobile device 110. In one example, communications with mobile device 110 may be via the application server 145 of network 140 acting as an intermediary. For instance, application server 145 may comprise a SMS server, a MMS server, an email server, an integrated messaging server (e.g., for handling multiple communication/message types), and so forth. In one example, application server 145 may comprise a computing system, such as computing system 400 depicted in FIG. 4, and may be configured to provide one or more functions for processing a communication that includes a textual content, as described herein. For instance, a communication from device 114 for mobile device 110 may initially be sent to application server 145, acting as a messaging server for mobile device 110. Application server 145 may confirm reachability of mobile device 110 prior to forwarding the communication, e.g., via network 140 and access network 120. Application server 145 may also store the communication for retrieval by the mobile device 110 or for a later attempted delivery to mobile device 110.

Thus, the system 100 provides an illustrative environment for processing a communication that includes a textual content in accordance with the present disclosure. To illustrate, a first user of mobile device 110 may wish to provide a second user of mobile device 112 (e.g., a family member, a colleague, an assistant, etc.), with access to the user's communications and at least some functions of a user interface of the mobile device 110 on the second mobile device 112. Accordingly, the first user may create a pairing profile for the second mobile device 112.

In one example, the pairing profile may be created on mobile device 110 and forwarded to mobile device 112 in advance of a pairing via any of the networks illustrated in FIG. 1, or via any number of other networks (not shown), via a peer-to-peer communication, and so forth. The pairing profile may specify that a communication from a third-party device should be forwarded from the mobile device 110 to the mobile device 112 under certain conditions. The pairing profile may establish the parameters or conditions under which a pairing, e.g., a setup of a wireless connection for communication forwarding, should occur. For instance, the pairing profile may provide an identifier of the mobile device 110 that the mobile device 112 should detect in the wireless environment prior to a pairing. Thus, a presence or proximity of one of the mobile devices by the other mobile device may be detected via Wi-Fi, Wi-Fi Direct, Bluetooth, and/or BLE communications, depending upon the device types and capabilities of mobile device 110 and mobile device 112. The pairing profile may also establish other parameters under which a pairing should occur. For example, the pairing profile may also specify that a confirmation should be received via one or both of the mobile devices 110 and 112 in order for a pairing should occur.

Alternatively, or in addition, the pairing profile may specify that another device should be detected by one or both of the mobile devices 110 and 112 prior to establishing a pairing according to the pairing profile. For instance, the pairing profile may specify that both of the mobile devices 110 and 112 should detect a nearby vehicle, such as vehicle 116, prior to establishing the pairing. For example, two colleagues or family members may enter the vehicle 116 for a trip, where the user of mobile device 110 may be driving the vehicle. Thus, the user of mobile device 110 (e.g., the driver) may wish to extend communication capabilities to the mobile device 112 for the passenger to receive and respond to incoming communications on behalf of the driver. In one example, the vehicle 116 may include a computing system, such as an entertainment system and/or a navigation system that includes a transceiver for wired or wireless networking. Thus, a presence or proximity of the vehicle 116 may be detected by the detection of the computing system of the vehicle 116, e.g., via Wi-Fi, Wi-Fi Direct, Bluetooth, and/or BLE, depending upon the device types and capabilities of the computing system of the vehicle 116, mobile device 110 and mobile device 112.

The pairing profile may also establish a reduced user interface for the mobile device 112 to receive forwarded communications from mobile device 110. For instance, the reduced user interface may comprise a reduced feature set that omits at least one user interface feature as compared to a user interface for presenting the communication on the mobile device 110. The paring profile may also establish how certain communications are to be modified before forwarding to the mobile device 112. For example, the pairing profile may establish that attachments should be removed from an MMS message or an email message, an email chain should be removed, sender identifiers should be removed from headers of the communication, and so forth. In this regard, the communications may be modified by the mobile device 110 or by the mobile device 112 in accordance with the pairing profile.

Continuing with the present example, mobile device 110 may provide a pairing profile to device 112. Devices 110 and 112 may then detect the presence or proximity of the other device, e.g., via peer-to-peer wireless sensing, and establish a connection for pairing. The connection may comprise any non-cellular wireless connection, such as Wi-Fi Direct, Bluetooth, etc. In one example, mobile devices 110 and 112 may also detect a presence of vehicle 116, and/or receive confirmations that pairing should be established, as one or more additional parameters for establishing the pairing. Thereafter, an incoming communication may be received by mobile device 110 from device 114. The incoming communication may be received via any one or more of access networks 120 and 130, network 140, and so on. In one example, the communication is received by mobile device 110 via a cellular network connection. For instance, access network 120 may comprise a cellular network access, such as an evolved Universal Terrestrial Radio Access Network (eUTRAN) that includes one or more eNodeBs. An eNodeB may comprise a Long Term Evolution (LTE) network component that is similar to a cellular base station or a base transceiver stations (BTS) in cellular access networks employing pre-LTE and/or non-LTE architectures. Mobile device 110 may then forward the communication to mobile device 112 in accordance with the pairing profile, e.g., via a non-cellular wireless connection that is established in accordance with the pairing profile. In one example, mobile device 110 may modify the communication to create a modified communication prior to the forwarding. Mobile device 112 may then receive and present the communication (which may be a modified communication) for the user of the mobile device 112, e.g., a passenger in the vehicle 116. In one example, the presentation of the communication may also be via a reduced user interface as established according to the pairing profile.

The passenger may verbally interact with the driver to discuss how to respond to the communication. The passenger may then craft a content for a response to the communication via the mobile device 112 under the direction of the driver. The content may be relayed from the mobile device 112 to the mobile device 110 and repackaged into a complete reply message to be sent to device 114. In one example, the user of mobile device 110 may also authorize an extended user interface to be provided to the mobile device 112 and/or a complete or an expanded communication to be provided to the mobile device 112. For instance, based upon the verbal interaction, the user of the mobile device 110 may be satisfied that an attachment to the communication may be non-confidential. Thus, the user may provide authorization, e.g., a verbal command to the mobile device 110, to release the attachment for the mobile device 112 and/or to extend the reduced user interface of the mobile device 112 to include additional features that were previously excluded, such as an option to forward the communication with the attachment. In one example, the mobile device 110 may therefore send additional communication content and/or instructions to extend the user interface that is provided on the mobile device 112 in response to the verbal command from the user.

Although the foregoing is described in connection with examples where mobile devices 110 and 112 establish a pairing via a short-range wireless interface (e.g., peer-to-peer), in other examples, mobile devices 110 and 112 may establish a pairing via one or more network infrastructure elements. For example, access network 120 may comprise a public wireless local area network (WLAN), a Wi-Fi hotspot, or a Wide Area Network (WAN), where mobile devices 110 and 112 are paired via a wireless access point. Similarly, mobile devices 110 and 112 may be paired via a cellular network infrastructure. For instance, network 140 may comprise a cellular core network, such as an evolved packet core (EPC) network. As such, the forwarding of a communication, the providing of additional authorizations, and other exchanges between mobile devices 110 and 112 may traverse through access network 120, which may comprise an eUTRAN, and through network 140, which may comprise an EPC.

In addition, although the foregoing examples describe a process that is performed by mobile devices 110 and 112, in another example the present disclosure is implemented wholly or partially by a network-based application server, e.g., application server 145 in network 140. For example, communications for mobile device 110 may be filtered through application server 145. In addition to performing functions such as storing communications, locating mobile device 110, confirming reachability for delivering communications, and so forth, application server 145 may also operate according to a pairing profile created by mobile device 110 for mobile device 112. For example, mobile devices 110 and 112 may confirm that a pairing should be established according to the pairing profile. In the present example, when mobile devices 110 and 112 are paired, application server 145 may be configured to intercept communications for mobile device 110 and forward the communications to mobile device 112. In addition, the application server 145 may modify the communications, e.g., by anonymizing sender identifiers, removing attachments, etc., prior to forwarding a modified communication to the mobile device 112 in accordance with the pairing profile. The application server 145 may also store configuration parameters for a reduced user interface and/or an extended user interface. As such, the user of mobile device 110 may authorize an extended user interface and/or authorize the release of a full communication or an extended communication content via instructions to the application server 145 in the context of a particular communication.

For instance, an incoming MMS message from device 114 for mobile device 110 may be received by application server 145. Application server 145 may remove the multimedia attachment before forwarding to the message to mobile device 112 according to the pairing profile. The user of mobile device 112 may discuss the modified communication with the user of mobile device 110. In response, the user of mobile device 110 may verbally provide an instruction to mobile device 110 which may be relayed to application server 145 to release the full MMS message or to provide the multimedia attachment that was previously withheld. For instance, when the user of the mobile device 110 is comfortable that the additional content is non-confidential or may otherwise be disclosed to the user of the mobile device 112, the verbal command may be provided to cause application server 145 to release the additional content. The application server 145 may then send the additional content and/or a copy of the full MMS message to the mobile device 112. Alternatively, or in addition, the application server 145 may provide additional configuration data to extend additional user interface features to the mobile device 112, or may provide authorization instructions for the mobile device 112 to activate additional user interface features upon receiving consent/authorization from the user of the mobile device 110. The user of the mobile device 112 may then craft content for the response as described above, e.g., via the reduced user interface or via an extended user interface.

It should be noted that the system 100 has been simplified. In other words, the system 100 may be implemented in a different form than that which is illustrated in FIG. 1. For example, the system 100 may be expanded to include other network elements (not shown) such as border elements, routers, switches, policy servers, security devices, gateways, a content distribution network (CDN) and the like, without altering the scope of the present disclosure. Similarly, system 100 may omit various elements, substitute elements for devices that perform the same or similar functions and/or combine elements that are illustrated as separate devices. For example, application server 145 and/or device 114 may comprise functions that are spread across several devices that operate collectively to perform the respective functions described above. For instance, application server 145 and/or device 114 may be deployed as a virtual machine operating on one or more physical host devices in a same location or distributed among several physical locations. In addition, although two access networks 120 and 130, two mobile devices 110 and 112, and a device 114 are illustrated in FIG. 1, it should be understood that any number of access networks and devices may connect to the network 140. Thus, these and other modifications of the system 100 are all contemplated within the scope of the present disclosure.

Figure 2:
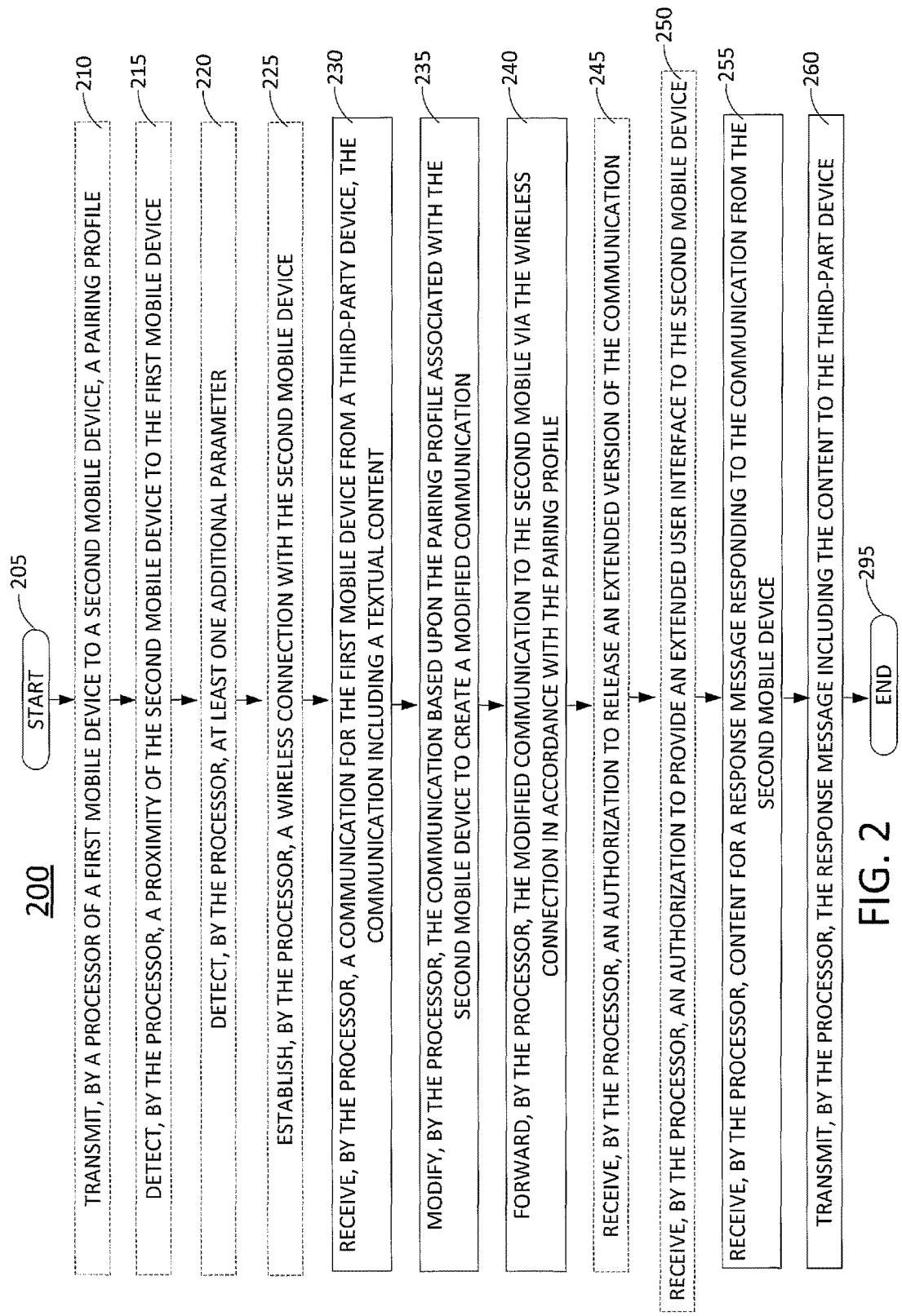
FIG. 2 illustrates a flowchart of an example method for processing a communication that includes a textual content, in accordance with the present disclosure.

FIG. 2 illustrates a flowchart of an example method 200 for processing a communication that includes a textual content, in accordance with the present disclosure. In one example, steps, functions and/or operations of the method 200 may be performed by a mobile device, such a mobile device 110 of FIG. 1. Alternatively, or in addition, the steps, functions, or operations of the method 200 may be performed by a computing device or system 400, and/or processor 402 as described in connection with FIG. 4 below. For illustrative purposes, the method 200 is described in greater detail below in connection with an example performed by a processor, such as processor 402. For instance, processor 402 may represent a processor of a first mobile device.

The method begins in step 205 and may proceed to optional step 210. At step 210, the processor may transmit a pairing profile to a second mobile device. In one example, the pairing profile may be created by a user of the first mobile device for the second mobile device. In other words, the pairing profile is associated with the second mobile device. For example, a parent may create a pairing profile for a child's mobile device, another user may create a pairing profile for a co-worker's mobile device, and so forth. In another example, a user may create one or more pairing profiles for static or dynamic assignment to multiple other mobile devices. For instance, a first pairing profile may be created for a certain type of situation or a category of users, while another pairing profile may be created for a different situation or a different category of users. The pairing profiles may then be statically or dynamically assigned to the mobile devices of the different users depending upon the situation and/or the category of the other user. The pairing profile may specify various parameters as described above, such as under what conditions a pairing should occur, whether and how to modify a communication that is to be forwarded, which user interface features should be included in a reduced user interface for the second mobile device, and so forth. The second mobile device may already include a user interface with various user interface features that may be activated and deactivated based upon instructions in the pairing profile. Alternatively, or in addition, the processor may provide a user interface (e.g., a reduced user interface) to the second mobile device in the form of executable instructions which may be loaded into a memory and executed by a processor of the second mobile device to provide the user interface features of the reduced user interface.

At optional step 215, the processor may detect a proximity of the second mobile device to the first mobile device. For instance, the pairing profile may provide an identifier of the first mobile device that the second mobile device should detect in the wireless environment prior to a pairing. The processor may also retain and store an identifier of the second mobile device that the processor may listen for and detect in the wireless environment. Thus, a presence or proximity of one of the mobile devices by the other mobile device may be detected via Wi-Fi, Wi-Fi Direct, Bluetooth, and/or BLE communications, depending upon the device types and capabilities of mobile devices.

At optional step 220, the processor may detect at least one additional parameter. For instance, upon the detection of the proximity of the second mobile device at optional step 220, a confirmation dialog may be provided to one or both of the mobile devices to confirm that the mobile devices should be paired according to the pairing profile. In other words, the at least one additional parameter may comprise a confirmation that pairing should be activated. The at least one additional parameter may also comprise: a detection of one or both mobile devices moving at a particular speed, a detection of a vehicle by one or both mobile devices, e.g., a detection of in-vehicle navigation system, and so forth.

At optional step 225, the processor may establish a wireless connection with the second mobile device. In one example, the wireless connection may comprise a non-cellular wireless connection. However, in another example, the connection may be established via a cellular network and/or via at least one network-based component. For example, the wireless connection may comprise a bridge via a computing system of a vehicle, an access point of a wireless local area network (WLAN), and so on. In one example, the wireless connection is established at step 225 based upon the pairing profile in response to a detection of the proximity of the second mobile device to the first mobile device (e.g., at optional step 215) and/or in response to a detection of at least one additional parameter (e.g., at optional step 220).

At step 230, the processor receives a communication for the first mobile device from a third-party device, where the communication includes a textual content. For instance, a communication (e.g., a message) that includes a textual content may comprise a text-based message, such as a text message or SMS message, an email, a multimedia message, e.g., an MMS message with a document, an instant message via a chat application or via a social network application, and the like. In one example, the communication may be received via a cellular network.

At step 235, the processor modifies the communication based upon the paring profile that is associated with the second mobile device. For example, the pairing profile may specify that the communication from a third-party device should be forwarded to the second mobile device, but the communication should be modified as compared to how the communication may be presented on the first mobile device. For example, for an MMS message, only the text of the message may be presented, email attachments may be removed from an email message, email chains may be removed, and so forth. In another example, a contact list on the first mobile device may store modified identities or anonymous identifiers for various contacts that may be substituted for use on the second mobile device. For instance, a user of the first mobile device may designate his or her brother only as "family member 3" such that an incoming message from the brother will only appear as a message from "family member 3" when presented on the second mobile device. Other modifications to the communication, e.g., as described in additional examples above, may also be provided at step 235.

At step 240, the processor forwards the modified communication to the second mobile device via a wireless connection in accordance with the pairing profile. For instance, the wireless connection may be established as described above in connection with optional step 225.

At optional step 245, the processor may receive an authorization to release an extended version of the communication. For example, a user of the first mobile device may provide a verbal command to release an attachment to the communication, to reveal identifying information of a sender of the communication that was previously removed from the communication, and so forth. Thus, the processor may send additional communication content to the second mobile device in response to the authorization of the user of the first mobile device. In one example, the voice of the user may also be verified by the processor, e.g., by matching a stored voice pattern/signature, such that only the voice of the user of the first mobile device may result in the release of the additional content of the communication.

At optional step 250, the processor may receive an authorization to provide an extended user interface to the second mobile device. For example, as mentioned above, a reduced user interface may be provided for the second mobile device to present the communication and to receive inputs for interacting with the communication. For instance, the reduced user interface may omit user interface features for forwarding, copying or storing the communication, and so on. However, if the user of the second mobile device provides information regarding the communication to the user of the first mobile device, the user of the first mobile device may determine that additional options for interacting with the communication should be granted to the second mobile device. As referred to herein, an extended user interface may include at least one additional user interface feature as compared to the reduced user interface. For example, the extended user interface may include a true identifier of the third-party, e.g., including a telephone number, a real name, an email address, a photograph, a chat history, etc.), whereas the reduced user interface that is initially extended to the second mobile device in accordance with the pairing profile may include an anonymous identifier of the third-party. In another example, the user of the first mobile device may wish to permit the user of the second mobile device to create a multimedia content for a reply message, e.g., as opposed to a text-only response. Similarly, the user of the first mobile device may wish to permit the user of the second mobile device to forward the communication to another contact.

Accordingly, the processor may receive one or more authorizations from the user of the first mobile device at optional step 250 and extend one or more additional user interface features to the second mobile device. In one example, an authorization may comprise a verbal command similar to that which is described above in connection with optional step 240. In one example, the voice of the user may also be verified (e.g., via a voiceprint) such that only the voice of the user of the first mobile device may result in the granting of an extended user interface to the second mobile device. In one example, the processor may notify the second user device via one or more authorizing instructions via the wireless connection. In another example, the processor may provide executable instructions which may be loaded into a memory and executed by a processor of the second mobile device to provide the additional user interface features of the extended user interface.

At step 255, the processor receives, from the second mobile device, content for a response message responding to the communication. The content may be received via the wireless connection established in accordance with the pairing profile, e.g., as described above in connection with optional step 225 and/or which is used to forward the modified communication at step 240.

At step 260, the processor transmits the response message including the content to the third-party device. For instance, the response message may be sent via the same network from which the communication is received at step 230, e.g., a cellular network. In one example, the processor may create a full response message based upon the content. For example, the processor may add a user identifier to a header of the message, e.g., a telephone number, an email address, etc. In the case of an email, the processor may also append the content with an email chain that may have been stripped from the communication at step 235. It should be noted that the processor may package the content received from the second mobile device into a reply message in various ways depending upon the restrictions placed on the second mobile device in accordance with the pairing profile, based upon the particular type of communication, e.g., a SMS or MMS message, an email, etc., and based upon other factors.

Following step 260, the method 200 proceeds to step 295. At step 295, the method 200 ends.

Figure 3:
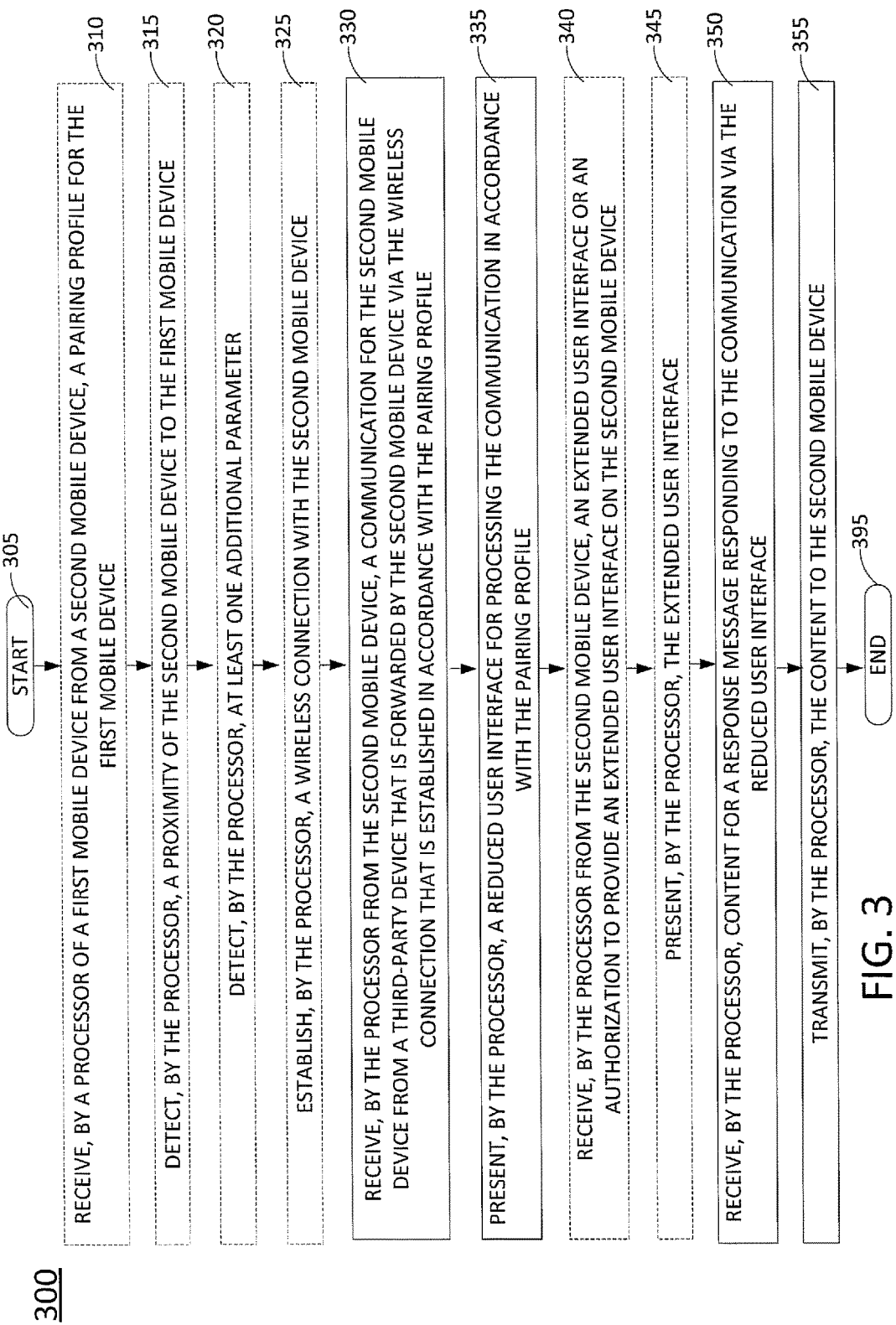
FIG. 3 illustrates a flowchart of an additional example method for processing a communication that includes a textual content, in accordance with the present disclosure.

FIG. 3 illustrates a flowchart of an example method 300 for processing a communication that includes a textual content, in accordance with the present disclosure. In one example, steps, functions and/or operations of the method 300 may be performed by a mobile device, such a mobile device 112 of FIG. 1. Alternatively, or in addition, the steps, functions, or operations of the method 300 may be performed by a computing device or system 400, and/or processor 402 as described in connection with FIG. 4 below. For illustrative purposes, the method 300 is described in greater detail below in connection with an example performed by a processor, such as processor 402. For instance, processor 402 may represent a processor of a first mobile device (e.g., a "secondary mobile device" for responding to a forwarded communication from a second mobile device, e.g., a "primary mobile device," as described above).

The method begins in step 305 and may proceed to optional step 310. At optional step 310, the processor may receive a pairing profile for the first mobile device from a second mobile device. For instance, a user of the second mobile device may have created the pairing profile for the first mobile device as described above in connection with optional step 210 of the method 200.

At optional step 315, the processor detects a proximity of the second mobile device to the first mobile device. For instance, the pairing profile may provide an identifier of the second mobile device that the first mobile device should detect in the wireless environment prior to a pairing. In one example, a presence or proximity of one of the mobile devices by the other mobile device may be detected via Wi-Fi, Wi-Fi Direct, Bluetooth, and/or BLE communications, depending upon the device types and capabilities of the mobile devices.

At optional step 320, the processor may detect at least one additional parameter. For example, upon the detection of the proximity of the second mobile device at optional step 315, a confirmation dialog may be provided to one or both of the mobile devices to confirm that the mobile devices should be paired according to the pairing profile. The at least one additional parameter may comprise: a detection of one or both mobile devices moving at a particular speed, a detection of a vehicle by one or both mobile devices, and so forth.

At optional step 325, the processor may establish a wireless connection with the second mobile device. In one example, the wireless connection may comprise a non-cellular wireless connection. However, in another example, the connection may be established via a cellular network and/or via at least one network-based component. For example, the wireless connection may comprise a bridge via a computing system of a vehicle, an access point of a wireless local area network (WLAN), and so on. In one example, the wireless connection is established at optional step 325 based upon the pairing profile in response to a detection of the proximity of the second mobile device to the first mobile device (e.g., at optional step 315) and/or in response to a detection of at least one additional parameter (e.g., at optional step 320).

At step 330, the processor receives from the second mobile device a communication destined for the second mobile device from a third-party device. In other words, the second mobile device may receive the communication from the third-party device and forward the communication, which is received by the processor at step 330. In one example, the communication is received via a wireless connection that is established in accordance with the pairing profile. For instance, the wireless connection may be established as described above in connection with optional step 325. In one example, the communication may comprise a modified communication that has been altered or had content removed before being forwarded by the second mobile device.

At step 335, the processor presents a reduced user interface for processing the communication in accordance with the pairing profile. For example, the first mobile device may already include a user interface with various user interface features that may be activated and deactivated based upon instructions which may be included in the pairing profile received at optional step 310. Alternatively, or in addition, the processor may be provided with a user interface (e.g., a reduced user interface) in the form of executable instructions which may be loaded into a memory and executed by the processor to provide the user interface features of the reduced user interface.

At optional step 340, the processor may receive an extended user interface, or an authorization to provide an extended user interface. For example, a user of the second mobile device may determine that additional user interface functions should be allowed for the user of the first mobile device after the user of the second mobile device provides verbal information regarding the communication. Thus, the user of the second mobile device may provide a verbal instruction to the second mobile device. In turn, the second mobile device may provide an instruction that is received at optional step 340, or may provide executable instructions which may be loaded into a memory and executed by the processor to provide the user interface features of the extended user interface.

At optional step 345, the processor may present the extended user interface. For instance, in one example, the processor may activate user interface features stored on the first mobile device, e.g., in response to an authorizing instruction received at optional step 340. In another example, the processor may load executable instructions received at step 340 into a memory and execute the instructions to provide the user interface features of the extended user interface.

At step 350, the processor receives content for a response message responding to the communication via the reduced user interface (or via the extended user interface). For instance, in one example, the user of the first mobile device may be limited to providing a text only response content via the reduced user interface (or the extended user interface). In another example, the reduced user interface (or the extended user interface) may enable the user of the first mobile device to provide a response beyond a text only response, e.g., adding an image, audio or video content into the response. However, an identity of the third-party who sent the original communication may still be hidden or obscured, for example.

At step 355, the processor transmits the content to the second mobile device. For example, the content may be transmitted via the wireless connection that may be established at optional step 325. The second mobile device may then create a full response message based upon the content and send the response message back to the third-party device that sent the original communication.

Following step 355, the method 300 proceeds to step 395. At step 395, the method 300 ends.

It should be noted that although not specifically specified, one or more steps, functions or operations of the method 200 or the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the example embodiments of the present disclosure.

As such, the present disclosure provides at least one advancement in the technical field of mobile device pairing. For instance, examples of the present disclosure include mobile devices that establish pairing profiles that enable other mobile devices to receive and respond to forwarded communications, but where aspects of the communications, or a user interface for interacting with the communication may be modified. For instance, a processor of a primary mobile device may remove or anonymize an identifier of a sender of the communication, remove an attachment from the communication, and so forth, prior to forwarding the communication to a secondary mobile device. The processor may also authorize an extended user interface for the secondary mobile device to interact with the communication upon receiving additional input, e.g., a verbal command at the primary mobile device. In another example, a processor of a secondary mobile device may receive a forwarded communication and present a reduced and/or an extended user interface for interacting with the communication.

In addition, embodiments of the present disclosure improve the functioning of a computing device, e.g., a mobile endpoint device. Namely, mobile endpoint devices for processing a communication that includes a textual content are improved in the examples of the present disclosure insofar as such mobile endpoint devices may receive a communication from a third-party device that includes a textual content, modify the communication based upon a pairing profile associated with a second mobile device to create a modified communication, forward the modified communication to the second mobile device via a wireless connection in accordance with the pairing profile, receive content for a response message responding to the communication from the second mobile device and transmit the response message including the content to the third-party device.

Mobile endpoint devices for processing a communication that includes a textual content are also improved in the examples of the present disclosure insofar as such mobile endpoint devices may receive from a second mobile device, a communication from a third-party device that is forwarded by the second mobile device via a wireless connection that is established in accordance with a pairing profile, present a reduced user interface for processing the communication in accordance with the pairing profile, receive content for a response message responding to the communication via the reduced user interface and transmit the content to the second mobile device. Notably, no previous mobile device has performed these functions as described herein. For example, previous mobile devices may simply establish a message forwarding profile. When message forwarding is activated, all messages may be forwarded to a secondary device, without any restriction on the content or how a user of the secondary device may interact with the message.

Figure 4:
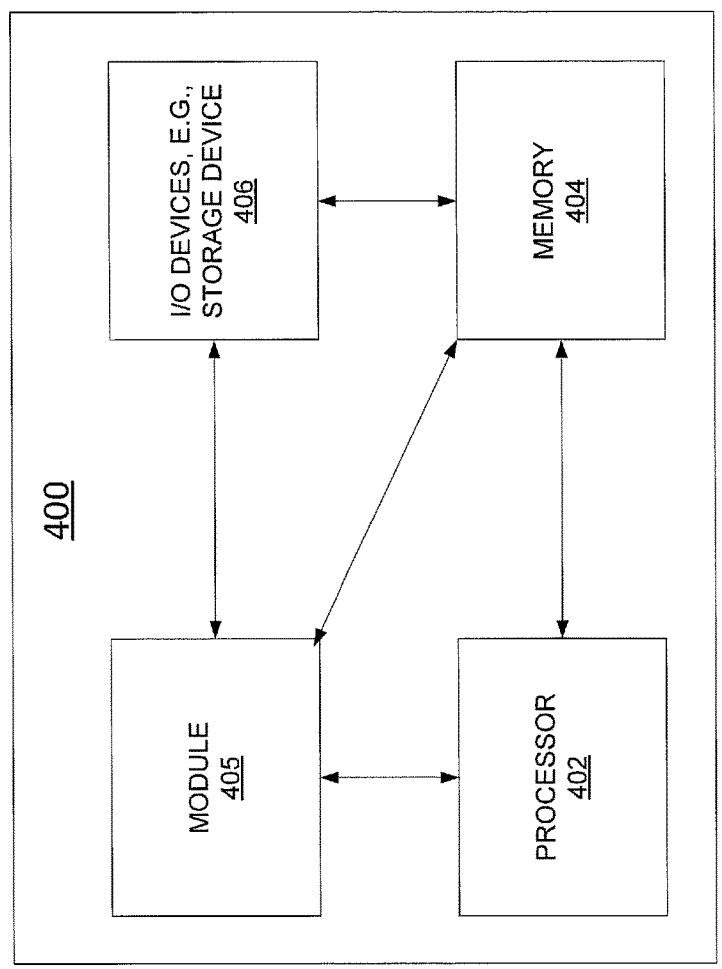
FIG. 4 illustrates an example high-level block diagram of a computer specifically programmed to perform the steps, functions, blocks, and/or operations described herein.

FIG. 4 depicts a high-level block diagram of a computing device suitable for use in performing the methods, steps, functions, and/or operations described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for processing a communication that includes a textual content, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method(s) discussed above can be used to configure a hardware processor to perform the steps, functions and/or operations of the above disclosed method 200 or method 300. In one embodiment, instructions and data for the present module or process 405 for processing a communication that includes a textual content (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for processing a communication that includes a textual content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
    receiving, by a processor of a first mobile device, a communication for the first mobile device from a third-party device, the communication containing content including at least a textual content;
    modifying, by the processor, the communication based upon a pairing profile associated with a second mobile device to create a modified communication, wherein the pairing profile specifies a lesser amount of the content of the communication is to be included in the modified communication;
    forwarding, by the processor, the modified communication to the second mobile device via a wireless connection in accordance with the pairing profile;
    receiving, by the processor, another content responding to the communication from the second mobile device; and
    transmitting, by the processor, a response message including the another content to the third-party device.

2. The method of claim 1, further comprising:
    transmitting, by the processor to the second mobile device, the pairing profile;
    detecting, by the processor, a proximity of the second mobile device to the first mobile device; and
    establishing, by the processor, the wireless connection with the second mobile device based upon the pairing profile in response to the detecting the proximity of the second mobile device to the first mobile device.

3. The method of claim 2, further comprising:
    detecting at least one additional parameter, wherein the establishing the wireless connection is in response to the detecting the proximity of the second mobile device to the first mobile device and in response to the detecting the at least one additional parameter.

4. The method of claim 3, wherein the at least one additional parameter comprises a detection of a vehicle.

5. The method of claim 3, wherein the at least one additional parameter comprises:
    a confirmation of the second mobile device that the second mobile device detects a proximity of the first mobile device to the second mobile device;
    a confirmation of a user of the first mobile device that the wireless connection should be established; or
    a confirmation of a user of the second mobile device that the wireless connection should be established.

6. The method of claim 2, wherein the establishing the wireless connection with the second mobile device based upon the pairing profile comprises a mirroring of the first mobile device at the second mobile device for receiving the modified communication.

7. The method of claim 6, wherein the mirroring of the first mobile device at the second mobile device for receiving the modified communication comprises a reduced user interface for interacting with the modified communication via the second mobile device.

8. The method of claim 7, wherein the reduced user interface excludes at least one user interface feature that is available in a user interface of the first mobile device.

9. The method of claim 1, wherein the communication comprises the at least the textual content and a media portion, wherein the modifying the communication to create the modified communication comprises:
    removing the media portion.

10. The method of claim 1, further comprising:
    receiving, by the processor, an authorization to release an extended version of the communication; and
    transmitting, by the processor, the extended version of the communication to the second mobile device.

11. A non-transitory computer-readable medium storing instructions which, when executed by a processor of a first mobile device, cause the processor to perform operations, the operations comprising:
    receiving a communication for the first mobile device from a third-party device, the communication containing content including at least a textual content;
    modifying the communication based upon a pairing profile associated with a second mobile device to create a modified communication, wherein the pairing profile specifies a lesser amount of the content of the communication is to be included in the modified communication;
    forwarding the modified communication to the second mobile device via a wireless connection in accordance with the pairing profile;
    receiving another content responding to the communication from the second mobile device; and
    transmitting a response message including the another content to the third-party device.

12. The non-transitory computer-readable medium of claim 11, the operations further comprising:
    transmitting the pairing profile to the second mobile device;
    detecting a proximity of the second mobile device to the first mobile device; and
    establishing the wireless connection with the second mobile device based upon the pairing profile in response to the detecting the proximity of the second mobile device to the first mobile device.

13. A method comprising:
    receiving, by a processor of a first mobile device from a second mobile device, a communication for the second mobile device from a third-party device that is forwarded by the second mobile device via a wireless connection that is established in accordance with a pairing profile associated with the first mobile device, wherein the communication has been modified by the second mobile device in accordance with the pairing profile, wherein the pairing profile specifies a lesser amount of content of a second communication received by the second mobile device from the third-party device is to be forwarded in the communication;
    presenting, by the processor, a reduced user interface for processing the communication in accordance with the pairing profile;

receiving, by the processor, another content responding to the communication via the reduced user interface; and transmitting, by the processor, the another content to the second mobile device.

14. The method of claim 13, further comprising:

receiving, by the processor from the second mobile device, the pairing profile for the first mobile device;

detecting, by the processor, a proximity of the second mobile device to the first mobile device; and establishing, by the processor, the wireless connection with the second mobile device in response to the detecting the proximity of the second mobile device to the first mobile device.

15. The method of claim 14, wherein parameters for the reduced user interface are received as part of the pairing profile.

16. The method of claim 14, further comprising:

detecting at least one additional parameter, wherein the establishing the wireless connection is in response to the detecting the proximity of the second mobile device to the first mobile device and in response to the detecting the at least one additional parameter.

17. The method of claim 13, wherein parameters for the reduced user interface are received in connection with the receiving the communication for the second mobile device forwarded by the second mobile device in accordance with the pairing profile.

18. The method of claim 13, wherein the reduced user interface excludes at least one user interface feature that is available in a user interface of the second user device.

19. The method of claim 18, wherein the at least one user interface feature that is available in the user interface of the second user device that is excluded from the reduced user interface comprises:

a module for playing a multimedia portion of the communication;

a display area for displaying an identifier of the third-party from which the communication was sent; or a user input module for saving the message, for forwarding the message, or for printing the message.

20. The method of claim 19, wherein the identifier comprises:

a picture of the third-party;

a name of the third-party;

a phone number of the third-party;

an email address of the third-party; or an account handle of the third-party.

\* \* \* \* \*